US011898121B2

(12) United States Patent
Herzberger et al.

(10) Patent No.: US 11,898,121 B2
(45) Date of Patent: Feb. 13, 2024

(54) DISHWASHING COMPOSITION HAVING IMPROVED SUDSING

(71) Applicant: The Procter & Gamble Company, Cincinnati, OH (US)

(72) Inventors: Jana Verena Margarethe Herzberger, Florence, KY (US); Pieter Jan Maria Saveyn, Heusden (BE); Steven Daryl Smith, Fairfield, OH (US); Evelyne Johanna Lutgarde Van Hecke, Bachte-Maria-Leern (BE); Valerie Wong, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 113 days.

(21) Appl. No.: 17/505,675

(22) Filed: Oct. 20, 2021

(65) Prior Publication Data

US 2022/0127548 A1 Apr. 28, 2022

(30) Foreign Application Priority Data

Oct. 23, 2020 (EP) .................................... 20203485

(51) Int. Cl.

| | |
|---|---|
| ***C11D 1/02*** | (2006.01) |
| ***C11D 1/75*** | (2006.01) |
| ***C11D 3/37*** | (2006.01) |
| ***C11D 1/94*** | (2006.01) |
| ***C11D 11/00*** | (2006.01) |
| ***C11D 1/22*** | (2006.01) |
| ***C11D 1/14*** | (2006.01) |
| *C11D 1/29* | (2006.01) |
| *C11D 1/72* | (2006.01) |
| *C11D 1/88* | (2006.01) |

(52) U.S. Cl.

CPC .................. *C11D 1/94* (2013.01); *C11D 1/14* (2013.01); *C11D 1/22* (2013.01); *C11D 1/75* (2013.01); *C11D 3/37* (2013.01); *C11D 3/3753* (2013.01); *C11D 11/0023* (2013.01); *C11D 1/29* (2013.01); *C11D 1/72* (2013.01); *C11D 1/88* (2013.01)

(58) Field of Classification Search

CPC .... C11D 1/14; C11D 1/22; C11D 1/29; C11D 1/75; C11D 3/37; C11D 3/3711

USPC ................ 510/235, 237, 426, 427, 475, 505

See application file for complete search history.

(56) References Cited

U.S. PATENT DOCUMENTS

| | | | |
|---|---|---|---|
| 5,330,675 | A | 7/1994 | Kroner et al. |
| 5,466,762 | A | 11/1995 | Kroner et al. |
| 2017/0218315 | A1 | 8/2017 | Rasmussen et al. |

FOREIGN PATENT DOCUMENTS

| | | | |
|---|---|---|---|
| EP | 3456805 | A1 * | 3/2019 |
| GB | 1073462 | A | 6/1967 |
| WO | 2018003683 | A1 | 1/2018 |

OTHER PUBLICATIONS

CM05261 Extended EP Search Report and Written Opinion for EP20203485.6 dated Mar. 25, 2021, 8 pages.

* cited by examiner

*Primary Examiner* — Gregory R Del Cotto

(74) *Attorney, Agent, or Firm* — Carolyn S. Powell; George H. Leal; Melissa Gartstein Krasovec

(57) ABSTRACT

The need for a liquid hand-dishwashing composition which provides further improved sudsing volume and longevity when washing dishware using diluted liquid hand dishwashing compositions, especially in the presence of greasy soil, while still providing the desired cleaning, is met when the composition is formulated with from 5% to 50% of a sudsing surfactant system and from 0.05% to 5.0% polyvinyl acetal polymer.

17 Claims, No Drawings

DISHWASHING COMPOSITION HAVING IMPROVED SUDSING

FIELD OF THE INVENTION

The present invention relates to a liquid hand dishwashing cleaning composition.

BACKGROUND OF THE INVENTION

During manual dishwashing in a sink full of water into which a cleaning composition has been diluted, the user typically relies on the level of suds to indicate the remaining cleaning efficacy of the diluted cleaning composition. A high suds volume and/or stable, long-lasting suds longevity (i.e., mileage) indicates to the user that sufficient active ingredients (e.g., surfactants) remain, in order to perform the desired cleaning. Poor suds longevity typically leads to the user dosing additional cleaning composition even when cleaning efficacy remains.

Anionic surfactants have been used to provide suds during hand dishwashing, with alkyl sulphate and alkyl alkoxy sulphates having a high proportion of C12, C13 and C14, particularly C12 and C13 chains being found to be particularly effective at providing improved sudsing in addition to the desired cleaning. Such sulphated surfactants can be derived from synthetic alcohols, such as OXO-alcohols and Fisher Tropsh alcohols, or from naturally derived alcohols, or from mixtures thereof. Fractionation can be used to increase the proportion of C12, C13 and C14, preferably C12 and C13 alkyl chains. In order to further boost suds volume and/or longevity, these anionic surfactants are typically formulated together with further co-surfactants selected from the group consisting of amphoteric surfactants, zwitterionic surfactants, nonionic surfactants, alternative anionic surfactants, or mixtures thereof.

The suds volume and longevity are significantly affected though by the presence of greasy soils in the dish-washing liquor. Hence, there remains a need to further improve the sudsing volume and longevity when washing dishware using diluted liquid hand dishwashing compositions, especially in the presence of greasy soil.

A broad variety of suds boosting technologies have been described in the prior art including polyvinylalcohol polymers, particularly polyvinylalcohol homopolymers, for instance, as described in EP3730594 and EP3730596. Such polyvinylalcohol polymers have been found to improve suds mileage in the presence of greasy soils, but are less effective for maintaining composition phase stability upon ageing. In addition, polyvinylalcohol homopolymers are typically solid at room temperature and difficult to dilute into clear and stable aqueous premixes to facilitate dosing and dissolution into the detergent composition.

Hence, a need remains to further improve the sudsing volume and longevity when washing dishware using diluted liquid hand dishwashing compositions, especially in the presence of greasy soil, while providing improved finished product physical stability upon ageing, and easier manufacturing.

EP3730594A relates to a liquid hand-dishwashing composition which provides further improved sudsing volume and longevity when washing dishware using diluted liquid hand dishwashing compositions, especially in the presence of greasy soil and particulate soil, while still providing the desired cleaning, which is met when the composition is formulated with from 5% to 50% of a sudsing surfactant system and polyvinyl alcohol having a viscosity of from 20 mPa·s to 55 mPa·s. EP3730596A relates to liquid hand dishwashing cleaning composition that is less hazy, while also provides reduced surface tension between the detergent composition and the soiled plate, and hence improvements in cleaning, which is met when the liquid hand dishwashing cleaning composition is formulated with a surfactant system and a polyvinyl alcohol having a degree of hydrolysis of from 40% to 86%. U.S. Pat. No. 3,629,122A relates to low-foaming rinsing and washing compositions adapted for dish washers consisting essentially of (A) from 70% to 98% by weight of water-soluble polyvinyl alcohols having a molecular weight of between 1000 and 4000, and (B) from 2% to 30% by weight of foam-inhibiting compounds selected from the group consisting of aliphatic alcohols, aliphatic carboxylic acids and alkali metal salts 20 thereof, aliphatic carboxylic acid amides and aliphatic amines, said compounds having at least one aliphatic or aliphatic-cycloaliphatic radical with from 8 to 22 carbon atoms, as well as aqueous solutions containing said low-foaming rinsing and washing compositions. CN107057861A relates to a cleaning preparation for porcelain glazes and glass utensils. The cleaning preparation comprises solid acid, carbonate and/or hydrogen carbonate, thickener and/or stabilizer and surfactant and further comprises disinfecting agent, aromatic agent, deodorant and dispersant. CN104818134 relates to a tea scale detergent. The tea scale detergent is prepared by, by weight, 5-10 parts of sodium chloride, 3-8 parts of sodium dichloro isocyanurate, 7-11 parts of sodium lauryl polyoxyethylene ether sulphate, 1-3 parts of deoiling emulsifier, 3-7 parts of trichloro hydroxydiphenyl ether, 4-8 parts of sodium dodecyl benzene sulphonate, 3-5 parts of sodium sulphate, 5-10 parts of lauroyl diethanolamide, 3-9 parts of citric acid, 1-5 parts of poval, 4-6 parts of hexa polyglycerol monooctanoin ether, 1-3 parts of sodium carbonate, 6-10 parts of sucrose fatty acid ether and 80 parts of water. The tea scale detergent seeks to provide the benefits of being capable of quickly cleaning tea scale, extremely low in residue, harmless to the human body, little in foam and easy to clean.

U.S. Pat. No. 4,539,145A relates to an outside window cleaner comprising mixtures of one or more polyvinyl alcohols with water, or preferably, polyvinyl alcohol, a cationic polymer, such as trimethylol melamine, and water, alters or modifies window or other hard surfaces such that water drains off in uniform sheets, leaving virtually no residue or spots caused from the deposition of dirt, cleaning compositions or a combination of the two. In a further embodiment, a selected cationic or nonionic surfactant is added to the formula of this invention to improve detergency while retaining the uniform drainage advantage in rinsing. CN104371855 relates to a low-foam glass cleaner which is prepared from the following raw materials in parts by weight: 6-8 parts of ethyl cellosolve, 3-9 parts of glycerol, 6-9 parts of borage seed oil, 6-9 parts of Vaseline, 0.2-1 part of ammonia water, 5-8 parts of sodium bicarbonate, 6-8 parts of polyvinyl alcohol, 5-7 parts of sodium lauryl sulphate, 2-4 parts of silicone, 5-10 parts of alkanolamide, 5-11 parts of fatty alcohol polyethenoxy ether, 2-6 parts of butanediol, 3-6 parts of triethanolamine, 4-8 parts of cocamidopropyl betaine, 2-6 parts of sodium benzoate and 1-5 parts of tetradecyl alcohol. The low-foam glass cleaner has the advantages of low foam and low cost, is easy to clean, and has certain antifogging function in the cleaning process. WO2018/169532A relates to benefit agent containing delivery particles suitable for use in consumer products, which comprise polyvinyl alcohol in the encapsulated core. U.S. Pat. No. 9,913,781B relates to a detergent composition including pigment granules containing a water-insoluble pigment, and at least two compounds selected from the group consisting of polyvinyl alcohol, a polyvinyl alcohol derivative, polyvinyl pyrrolidone and a polyvinyl pyrrolidone derivative.

SUMMARY OF THE INVENTION

The present invention relates to a liquid hand dishwashing cleaning composition comprising from 5% to 50% by weight of the composition of a surfactant system; and from 0.05% to 5.0% by weight of the composition of a polyvinyl acetal polymer The present invention further relates to a process for making a liquid detergent composition according to the present invention, comprising the step of adding the polyvinyl acetal polymer to an aqueous medium, before adding the surfactant system.

The present invention further relates to a method of manually washing dishware comprising the steps of: delivering a composition according to the invention to a volume of water to form a wash solution and immersing the dishware in the solution.

DETAILED DESCRIPTION OF THE INVENTION

The compositions of the present invention provide improved sudsing volume and suds longevity when washing dishware in the diluted liquid hand dishwashing compositions, even in the presence of greasy soil. The compositions of the present invention also provide good grease removal, in particular good removal of uncooked grease and particulate soils. (should we also add a sentence that they also provide good stability upon ageing and ease of manufacturing, in line with the problem statement from the background section?)

As used herein, articles such as "a" and "an" when used in a claim, are understood to mean one or more of what is claimed or described.

The term "comprising" as used herein means that steps and ingredients other than those specifically mentioned can be added. This term encompasses the terms "consisting of" and "consisting essentially of" The compositions of the present invention can comprise, consist of, and consist essentially of the essential elements and limitations of the invention described herein, as well as any of the additional or optional ingredients, components, steps, or limitations described herein.

The term "dishware" as used herein includes cookware and tableware made from, by non-limiting examples, ceramic, china, metal, glass, plastic (e.g., polyethylene, polypropylene, polystyrene, etc.) and wood.

The term "grease" or "greasy" as used herein means materials comprising at least in part (i.e., at least 0.5 wt % by weight of the grease) saturated and unsaturated fats and oils, preferably oils and fats derived from animal sources such as beef, pig and/or chicken.

The terms "include", "includes" and "including" are meant to be non-limiting.

The term "particulate soils" as used herein means inorganic and especially organic, solid soil particles, especially food particles, such as for non-limiting examples: finely divided elemental carbon, baked grease particle, and meat particles.

The term "sudsing profile" as used herein refers to the properties of a cleaning composition relating to suds character during the dishwashing process. The term "sudsing profile" of a cleaning composition includes suds volume generated upon dissolving and agitation, typically manual agitation, of the cleaning composition in the aqueous washing solution, and the retention of the suds during the dishwashing process. Preferably, hand dishwashing cleaning compositions characterized as having "good sudsing profile" tend to have high suds volume and/or sustained suds volume, particularly during a substantial portion of or for the entire manual dishwashing process. This is important as the consumer uses high suds as an indicator that sufficient cleaning composition has been dosed. Moreover, the consumer also uses the sustained suds volume as an indicator that sufficient active cleaning ingredients (e.g., surfactants) are present, even towards the end of the dishwashing process. The consumer usually renews the washing solution when the sudsing subsides. Thus, a low sudsing cleaning composition will tend to be replaced by the consumer more frequently than is necessary because of the low sudsing level.

It is understood that the test methods that are disclosed in the Test Methods Section of the present application must be used to determine the respective values of the parameters of Applicants' inventions as described and claimed herein.

In all embodiments of the present invention, all percentages are by weight of the total composition, as evident by the context, unless specifically stated otherwise. All ratios are weight ratios, unless specifically stated otherwise, and all measurements are made at 25° C., unless otherwise designated.

Cleaning Composition

The cleaning composition is a hand dishwashing cleaning composition in liquid form. The cleaning composition is preferably an aqueous cleaning composition. As such, the composition can comprise at least 15%, or from 50% to 85%, preferably from 50% to 75%, by weight of the total composition of water.

Preferably, the pH of the composition is from about 6 to about 14, preferably from about 7 to about 12, or more preferably from about 7.5 to about 10, as measured at 10% dilution in distilled water at 20° C. The pH of the composition can be adjusted using pH modifying ingredients known in the art.

The composition of the present invention can be Newtonian or non-Newtonian, preferably Newtonian. Preferably, the composition has a viscosity of from 10 mPa·s to 10,000 mPa·s, preferably from 100 mPa·s to 5,000 mPa·s, more preferably from 300 mPa·s to 2,000 mPa·s, or most preferably from 500 mPa·s to 1,500 mPa·s, alternatively combinations thereof. The viscosity is measured at 20° C. with a Brookfield RT Viscometer using spindle 31 with the RPM of the viscometer adjusted to achieve a torque of between 40% and 60%.

Surfactant System

The cleaning composition comprises from 8% to 45%, preferably from 15% to 40%, by weight of the total composition of a surfactant system.

For improved sudsing, the surfactant system can comprise anionic surfactant. The surfactant system preferably comprises from 60% to 90% by weight of the surfactant system of the anionic surfactant. Alkyl sulphated anionic surfactants are preferred, particularly those selected from the group consisting of: alkyl sulphate, alkyl alkoxy sulphate, and mixtures thereof.

For further improvements in sudsing, the surfactant system can comprise less than 30%, preferably less than 15%, more preferably less than 10% of further anionic surfactant, and most preferably the surfactant system comprises no further anionic surfactant. The alkyl sulphated anionic surfactant preferably has an average alkyl chain length of from 8 to 18, preferably from 10 to 14, more preferably from 12 to 14, most preferably from 12 to 13 carbon atoms. The alkyl sulphated anionic surfactant has an average degree of alkoxylation, of less than 5, preferably less than 3, more preferably from 0.5 to 2.0, most preferably from 0.5 to 0.9. Preferably, the alkyl sulphated anionic surfactant is ethoxylated. That is, the alkyl sulphated anionic surfactant has an average degree of ethoxylation, of less than 5, preferably less than 3, more preferably from 0.5 to 2.0, most preferably from 0.5 to 0.9.

The average degree of alkoxylation is the mol average degree of alkoxylation (i.e., mol average alkoxylation degree) of all the alkyl sulphate anionic surfactant. Hence, when calculating the mol average alkoxylation degree, the mols of non-alkoxylated sulphate anionic surfactant are included:

$$\text{Mol average alkoxylation degree}=(x1*\text{alkoxylation degree of surfactant1}+x2*\text{alkoxylation degree of surfactant2}+\ldots)/(x1+x2+\ldots)$$

wherein x1, x2, . . . are the number of moles of each alkyl (or alkoxy) sulphate anionic surfactant of the mixture and alkoxylation degree is the number of alkoxy groups in each alkyl sulphate anionic surfactant.

If ethoxylated alkyl sulfate is present, without wishing to be bound by theory, through tight control of processing conditions and feedstock material compositions, both during alkoxylation especially ethoxylation and sulfation steps, the amount of 1,4-dioxane by-product within alkoxylated especially ethoxylated alkyl sulfates can be reduced. Based on recent advances in technology, a further reduction of 1,4-dioxane by-product can be achieved by subsequent stripping, distillation, evaporation, centrifugation, microwave irradiation, molecular sieving or catalytic or enzymatic degradation steps. Processes to control 1,4-dioxane content within alkoxylated/ethoxylated alkyl sulfates have been described extensively in the art. Alternatively 1,4-dioxane level control within detergent formulations has also been described in the art through addition of 1,4-dioxane inhibitors to 1,4-dioxane comprising formulations, such as 5,6-dihydro-3-(4-morpholinyl)-1-[4-(2-oxo-1-piperidinyl)-phenyl]-2-(1-H)-pyridone, 3-α-hydroxy-7-oxo stereoisomer-mixtures of cholinic acid, 3-(N-methyl amino)-L-alanine, and mixtures thereof.

Alternatively, the alkyl sulphate surfactant can be free of alkoxylation. It has been found that formulating hand dishwashing compositions comprising alkyl sulfate anionic surfactant with little or no alkoxylated alkyl sulfate surfactant results in less viscosity variation with changes in type of starting alcohol for the alkyl sulfate surfactant, as well as in an improved grease cleaning performance. However, reducing the degree of alkoxylation has also been found to cause low temperature instabilities in the formulation, as well as reduced suds mileage in the presence of emulsified grease.

The alkyl sulphate anionic surfactant can have a weight average degree of branching of more than 10%, preferably more than 20%, more preferably more than 30%, even more preferably between 30% and 60%, most preferably between 30% and 50%. The alkyl sulphate anionic surfactant can comprise at least 5%, preferably at least 10%, most preferably at least 25%, by weight of the alkyl sulphate anionic surfactant, of branching on the C2 position (as measured counting carbon atoms from the sulphate group for non-alkoxylated alkyl sulphate anionic surfactants, and the counting from the alkoxy-group furthest from the sulphate group for alkoxylated alkyl sulphate anionic surfactants). More preferably, greater than 75%, even more preferably greater than 90%, by weight of the total branched alkyl content consists of C1-C5 alkyl moiety, preferably C1-C2 alkyl moiety. It has been found that formulating the inventive compositions using alkyl sulphate surfactants having the aforementioned degree of branching results in improved low temperature stability. Such compositions require less solvent in order to achieve good physical stability at low temperatures. As such, the compositions can comprise lower levels of organic solvent, of less than 5.0% by weight of the cleaning composition of organic solvent, while still having improved low temperature stability. Higher surfactant branching also provides faster initial suds generation, but typically less suds mileage. The weight average branching, described herein, has been found to provide improved low temperature stability, initial foam generation and suds longevity.

The weight average degree of branching for an anionic surfactant mixture can be calculated using the following formula:

$$\text{Weight average degree of branching (\%)}=[(x1*\text{wt \% branched alcohol1 in alcohol1}+x2*\text{wt \% branched alcohol2 in alcohol2}+\ldots)/(x1+x2+\ldots)]*100$$

wherein x1, x2, . . . are the weight in grams of each alcohol in the total alcohol mixture of the alcohols which were used as starting material before (alkoxylation and) sulphation to produce the alkyl (alkoxy) sulphate anionic surfactant. In the weight average degree of branching calculation, the weight of the alkyl alcohol used to form the alkyl sulphate anionic surfactant which is not branched is included.

The weight average degree of branching and the distribution of branching can typically be obtained from the technical data sheet for the surfactant or constituent alkyl alcohol. Alternatively, the branching can also be determined through analytical methods known in the art, including capillary gas chromatography with flame ionisation detection on medium polar capillary column, using hexane as the solvent. The weight average degree of branching and the distribution of branching is based on the starting alcohol used to produce the alkyl sulphate anionic surfactant.

The alkyl chain of the alkyl sulphated anionic surfactant preferably has a mol fraction of C12 and C13 chains of at least 50%, preferably at least 65%, more preferably at least 80%, most preferably at least 90%. Suds mileage is particularly improved, especially in the presence of greasy soils, when the C13/C12 mol ratio of the alkyl chain is at least 50/50, preferably at least 57/43, preferably from 60/40 to 90/10, more preferably from 60/40 to 80/20, most preferably from 60/40 to 70/30, while not compromising suds mileage in the presence of particulate soils.

Suitable counterions include alkali metal cation earth alkali metal cation, alkanolammonium or ammonium or substituted ammonium, but preferably sodium.

Suitable examples of commercially available alkyl sulphate anionic surfactants include, those derived from alcohols sold under the Neodol® brand-name by Shell, or the Lial®, Isalchem®, and Safol® brand-names by Sasol, or some of the natural alcohols produced by The Procter & Gamble Chemicals company. The alcohols can be blended in order to achieve the desired mol fraction of C12 and C13 chains and the desired C13/C12 ratio, based on the relative fractions of C13 and C12 within the starting alcohols, as obtained from the technical data sheets from the suppliers or from analysis using methods known in the art.

In order to improve surfactant packing after dilution and hence improve suds mileage, the surfactant system can comprise an alkyl sulphate anionic surfactant and a co-surfactant. Preferred co-surfactants are selected from the group consisting of an amphoteric surfactant, a zwitterionic surfactant, and mixtures thereof. The co-surfactant is preferably an amphoteric surfactant, more preferably an amine oxide surfactant. The co-surfactant is included as part of the surfactant system.

The composition preferably comprises from 0.1% to 20%, more preferably from 0.5% to 15% and especially from 2% to 10% by weight of the cleaning composition of the co-surfactant. The surfactant system of the cleaning composition of the present invention preferably comprises from 10% to 40%, preferably from 15% to 35%, more preferably from 20% to 30%, by weight of the surfactant system of a co-surfactant. The alkyl sulphate anionic surfactant to the co-surfactant weight ratio can be from 1:1 to 8:1, preferably from 2:1 to 5:1, more preferably from 2.5:1 to 4:1.

As mentioned earlier, amine oxide surfactants are preferred for use as a co-surfactant. The amine oxide surfactant can be linear or branched, though linear are preferred. Suitable linear amine oxides are typically water-soluble, and characterized by the formula R1-N(R2)(R3)O wherein R1 is a C8-18 alkyl, and the R2 and R3 moieties are selected from the group consisting of C1-3 alkyl groups, C1-3 hydroxyalkyl groups, and mixtures thereof. For instance, R2 and R3 can be selected from the group consisting of: methyl, ethyl, propyl, isopropyl, 2-hydroxethyl, 2-hydroxypropyl and 3-hydroxypropyl, and mixtures thereof, though methyl is preferred for one or both of R2 and R3. The linear amine oxide surfactants in particular may include linear C10-C18 alkyl dimethyl amine oxides and linear C8-C12 alkoxy ethyl dihydroxy ethyl amine oxides. Preferably, the amine oxide surfactant is selected from the group consisting of: alkyl dimethyl amine oxide, alkyl amido propyl dimethyl amine oxide, and mixtures thereof. Alkyl dimethyl amine oxides are preferred, such as C8-18 alkyl dimethyl amine oxides, or C10-16 alkyl dimethyl amine oxides (such as coco dimethyl amine oxide). Suitable alkyl dimethyl amine oxides include C10 alkyl dimethyl amine oxide surfactant, C10-12 alkyl dimethyl amine oxide surfactant, C12-C14 alkyl dimethyl amine oxide surfactant, and mixtures thereof. C12-C14 alkyl dimethyl amine oxide are particularly preferred.

Alternative suitable amine oxide surfactants include mid-branched amine oxide surfactants. As used herein, "mid-branched" means that the amine oxide has one alkyl moiety having n1 carbon atoms with one alkyl branch on the alkyl moiety having n2 carbon atoms. The alkyl branch is located on the $\alpha$ carbon from the nitrogen on the alkyl moiety. This type of branching for the amine oxide is also known in the art as an internal amine oxide. The total sum of n1 and n2 can be from 10 to 24 carbon atoms, preferably from 12 to 20, and more preferably from 10 to 16. The number of carbon atoms for the one alkyl moiety (n1) is preferably the same or similar to the number of carbon atoms as the one alkyl branch (n2) such that the one alkyl moiety and the one alkyl branch are symmetric. As used herein "symmetric" means that |n1−n2| is less than or equal to 5, preferably 4, most preferably from 0 to 4 carbon atoms in at least 50 wt %, more preferably at least 75 wt % to 100 wt % of the mid-branched amine oxides for use herein. The amine oxide further comprises two moieties, independently selected from a C1-3 alkyl, a C1-3 hydroxyalkyl group, or a polyethylene oxide group containing an average of from about 1 to about 3 ethylene oxide groups. Preferably, the two moieties are selected from a C1-3 alkyl, more preferably both are selected as C1 alkyl.

Alternatively, the amine oxide surfactant can be a mixture of amine oxides comprising a mixture of low-cut amine oxide and mid-cut amine oxide. The amine oxide of the composition of the invention can then comprises:

a) from about 10% to about 45% by weight of the amine oxide of low-cut amine oxide of formula R1R2R3AO wherein R1 and R2 are independently selected from hydrogen, C1-C4 alkyls or mixtures thereof, and R3 is selected from C10 alkyls and mixtures thereof; and
b) from 55% to 90% by weight of the amine oxide of mid-cut amine oxide of formula R4R5R6AO wherein R4 and R5 are independently selected from hydrogen, C1-C4 alkyls or mixtures thereof, and R6 is selected from C12-C16 alkyls or mixtures thereof In a preferred low-cut amine oxide for use herein R3 is n-decyl, with preferably both R1 and R2 being methyl. In the mid-cut amine oxide of formula R4R5R6AO, R4 and R5 are preferably both methyl.

Preferably, the amine oxide comprises less than about 5%, more preferably less than 3%, by weight of the amine oxide of an amine oxide of formula R7R8R9AO wherein R7 and R8 are selected from hydrogen, C1-C4 alkyls and mixtures thereof and wherein R9 is selected from C8 alkyls and mixtures thereof. Limiting the amount of amine oxides of formula R7R8R9AO improves both physical stability and suds mileage.

Suitable zwitterionic surfactants include betaine surfactants. Such betaine surfactants includes alkyl betaines, alkylamidobetaine, amidazoliniumbetaine, sulphobetaine (INCI Sultaines) as well as the Phosphobetaine, and preferably meets formula (I):

$$R^1—[CO—X(CH_2)_n]_x—N^+(R^2)(R_3)—(CH_2)_m—[CH(OH)—CH_2]_y—Y^-$$

wherein in formula (I),

R1 is selected from the group consisting of: a saturated or unsaturated C6-22 alkyl residue, preferably C8-18 alkyl residue, more preferably a saturated C10-16 alkyl residue, most preferably a saturated C12-14 alkyl residue;

X is selected from the group consisting of: NH, NR4 wherein R4 is a C1-4 alkyl residue, O, and S, n is an integer from 1 to 10, preferably 2 to 5, more preferably 3, x is 0 or 1, preferably 1, R2 and R3 are independently selected from the group consisting of: a C1-4 alkyl residue, hydroxy substituted such as a hydroxyethyl, and mixtures thereof, preferably both R2 and R3 are methyl, m is an integer from 1 to 4, preferably 1, 2 or 3, y is 0 or 1, and Y is selected from the group consisting of: COO, S3, OPO(OR5)O or P(O)(OR5)O, wherein R5 is H or a C1-4 alkyl residue.

Preferred betaines are the alkyl betaines of formula (IIa), the alkyl amido propyl betaine of formula (IIb), the sulphobetaines of formula (IIc) and the amido sulphobetaine of formula (IId):

$$R^1—N^+(CH_3)_2—CH_2COO^- \quad (IIa)$$

$$R^1—CO—NH—(CH_2)_3—N^+(CH_3)_2—CH_2COO^- \quad (IIb)$$

$R^1—N^+(CH_3)_2—CH_2CH(OH)CH_2SO_3^-$ (IIc)

$R^1—CO—NH—(CH_2)_3—N^+(CH_3)_2—CH_2CH(OH)CH_2SO_3^-$ (IId)

in which R1 has the same meaning as in formula (I). Particularly preferred are the carbobetaines [i.e. wherein $Y^-$=COO— in formula (I)] of formulae (IIa) and (IIb), more preferred are the alkylamidobetaine of formula (IIb).

Suitable betaines can be selected from the group consisting or [designated in accordance with INCI]: capryl/capramidopropyl betaine, cetyl betaine, cetyl amidopropyl betaine, cocamidoethyl betaine, cocamidopropyl betaine, cocobetaines, decyl betaine, decyl amidopropyl betaine, hydrogenated tallow betaine/amidopropyl betaine, isostearamidopropyl betaine, lauramidopropyl betaine, lauryl betaine, myristyl amidopropyl betaine, myristyl betaine, oleamidopropyl betaine, oleyl betaine, palmamidopropyl betaine, palmitamidopropyl betaine, palm-kernelamidopropyl betaine, stearamidopropyl betaine, stearyl betaine, tallowamidopropyl betaine, tallow betaine, undecylenamidopropyl betaine, undecyl betaine, and mixtures thereof. Preferred betaines are selected from the group consisting of: cocamidopropyl betaine, cocobetaines, lauramidopropyl betaine, lauryl betaine, myristyl amidopropyl betaine, myristyl betaine, and mixtures thereof. Cocamidopropyl betaine is particularly preferred.

Preferably, the surfactant system of the composition of the present invention further comprises from 1% to 25%, preferably from 1.25% to 20%, more preferably from 1.5% to 15%, most preferably from 1.5% to 5%, by weight of the surfactant system, of a non-ionic surfactant.

Suitable nonionic surfactants can be selected from the group consisting of: alkoxylated non-ionic surfactant, alkyl polyglucoside ("APG") surfactant, and mixtures thereof.

Suitable alkoxylated non-ionic surfactants can be linear or branched, primary or secondary alkyl alkoxylated non-ionic surfactants. Alkyl ethoxylated non-ionic surfactants, especially primary alkyl ethoxylated non-ionic surfactants, are preferred. The ethoxylated non-ionic surfactant can comprise on average from 9 to 15, preferably from 10 to 14 carbon atoms in its alkyl chain and on average from 5 to 12, preferably from 6 to 10, most preferably from 7 to 8, units of ethylene oxide per mole of alcohol. Such alkyl ethoxylated nonionic surfactants can be derived from synthetic alcohols, such as OXO-alcohols, Ziegler alcohols and Fisher Tropsh alcohols, or from naturally derived alcohols, or from mixtures thereof. Suitable examples of commercially available alkyl ethoxylate nonionic surfactants include, those derived from synthetic alcohols sold under the Neodol® brand-name by Shell, or the Lial®, Isalchem®, and Safol® brand-names by Sasol, or some of the natural alcohols produced by The Procter & Gamble Chemicals company.

The compositions of the present invention can comprise alkyl polyglucoside ("APG") surfactant. The addition of alkyl polyglucoside surfactants have been found to improve sudsing beyond that of comparative nonionic surfactants such as alkyl ethoxylated surfactants. Preferably the alkyl polyglucoside surfactant can be selected from C6-C18 alkyl polyglucoside surfactant. The alkyl polyglucoside surfactant can have a number average degree of polymerization of from 0.1 to 3.0, preferably from 1.0 to 2.0, more preferably from 1.2 to 1.6. The alkyl polyglucoside surfactant can comprise a blend of short chain alkyl polyglucoside surfactant having an alkyl chain comprising 10 carbon atoms or less, and mid to long chain alkyl polyglucoside surfactant having an alkyl chain comprising greater than 10 carbon atoms to 18 carbon atoms, preferably from 12 to 14 carbon atoms. Short chain alkyl polyglucoside surfactants have a monomodal chain length distribution between C8-C10, mid to long chain alkyl polyglucoside surfactants have a monomodal chain length distribution between C10-C18, while mid chain alkyl polyglucoside surfactants have a monomodal chain length distribution between C12-C14. In contrast, C8 to C18 alkyl polyglucoside surfactants typically have a monomodal distribution of alkyl chains between C8 and C18, as with C8 to C16 and the like. As such, a combination of short chain alkyl polyglucoside surfactants with mid to long chain or mid chain alkyl polyglucoside surfactants have a broader distribution of chain lengths, or even a bimodal distribution, than non-blended C8 to C18 alkyl polyglucoside surfactants. Preferably, the weight ratio of short chain alkyl polyglucoside surfactant to long chain alkyl polyglucoside surfactant is from 1:1 to 10:1, preferably from 1.5:1 to 5:1, more preferably from 2:1 to 4:1. It has been found that a blend of such short chain alkyl polyglucoside surfactant and long chain alkyl polyglucoside surfactant results in faster dissolution of the detergent solution in water and improved initial sudsing, in combination with improved suds stability. C8-C16 alkyl polyglucosides are commercially available from several suppliers (e.g., Simusol® surfactants from Seppic Corporation; and Glucopon® 600 CSUP, Glucopon® 650 EC, Glucopon® 600 CSUP/MB, and Glucopon® 650 EC/MB, from BASF Corporation).

Polyvinyl Acetal Polymer

The liquid hand dishwashing composition comprises polyvinyl acetal polymer. The polyvinyl acetal polymer is present in dissolved form in the composition. It is believed that since the surfactant system and the polyvinyl acetal polymer are present in dissolved form in the aqueous composition, the polyvinyl acetal polymer is able to stabilise the suds and hence improve suds mileage. Polyvinyl acetal (PVAcetal) polymer is typically manufactured by polymerizing vinyl acetate monomers and then (partially) substituting the acetate groups with hydroxyl groups by hydrolysis to obtain polyvinyl alcohol (PVA). This polyvinyl alcohol polymer can be subsequently post-modified through a condensation reaction with an aldehyde to obtain the polyvinyl acetal polymer. Within such a condensation reaction part of the hydroxyl groups are converted into acetal groups. As such the polyvinyl acetal polymer comprises polyvinyl alcohol and polyvinyl acetal subunits, and consists of such subunits in the case of a 100% hydrolysed polyvinyl alcohol starting polymer prior to acetalization. When starting with a partially hydolyzed polyvinyl alcohol polymer (degree of hydrolysis of less than 100%), the polyvinyl acetal polymer will further comprise polyvinyl acetate subunits. These polyvinyl alcohol, polyvinyl acetal, and optional polyvinyl acetate subunits can be organized in blocks or randomly.

The properties of the polyvinyl acetal polymer are largely governed by the molecular weight, the degree of acetate to hydroxyl substitution (e.g. degree of hydrolysis), the degree of hydroxyl to acetal substitution (e.g. degree of acetalization) and the type of acetal substitution. Due to the difficulties of measuring molecular weight of polyvinyl alcohol and polyvinyl acetal polymers, the molecular weight of polyvinyl alcohol and polyvinyl acetal polymers is typically expressed as a viscosity. The polyvinyl acetal polymer of use in the present invention can have an average viscosity of from 1 mPa·s to 25 mPa·s, when measured as a 4% aqueous solution in demineralised water at 20° C. The viscosity of the freshly made polyvinyl acetal polymer aqueous solution is measured using a Brookfield LV type viscometer with UL adapter as described in British Standard EN ISO 15023-2:2006 Annex E Brookfield Test method. For further sudsing benefit, the polyvinyl acetal polymer can have an average viscosity of from 1 mPa·s to 15 mPa·s, preferably of from 1 cps to 10 ps, more preferably of from 1 to 5 mPa·s.

The suds mileage is further improved when the polyvinyl acetal polymer is only partially hydrolysed, thereby leaving some acetate groups present. In particular, the polyvinyl acetal polymer preferably has an average degree of hydrolysis (dH) of from 45% to 98%, more preferably from 75% to 90%, and most preferably from 78% to 88%. As is well known to the skilled person, the degree of hydrolysis is expressed as mol %. If the polyvinyl acetal polymer is hydrolyzed to the maximum possible extent (>99%), then the formation of hydrogen bonding can be very intense, resulting in a strong network in solution, in addition to reduced solubility of the polyvinyl acetal polymer. As such, partially hydrolysed polyvinyl acetal polymer typically results in a looser and less strong network of the polyvinyl acetal polymer in the detergent composition. It is believed that more of the polyvinyl acetal polymer migrates to the suds air-water interface when the degree of hydrolysis is within the aforementioned range.

The polyvinyl alcohol polymer starting material prior to conversion into a polyvinyl acetal polymer is preferably a partially hydrolysed homopolymer, i.e. solely comprising polyvinyl acetate and polyvinyl alcohol units, hence excluding further monomer or polymer modifications. As such the resulting polyvinyl acetal polymer according to the invention most preferably solely comprises subunits selected from the group consisting of: polyvinyl acetal, polyvinyl acetate and polyvinyl alcohol.

The polyvinyl acetal polymer can have an average degree of acetal substitution expressed as mol % of from 0.5% to 10%, preferably of from 0.75% to 5.0%, more preferably of from 1.0% to 2.5%. It is believed that a polyvinyl acetal polymer with this average degree of acetal substitution (degree of acetalization) provides the right balance between improving suds mileage performance in the presence of greasy soils, while still being able to create stable aqueous polymer solutions to facilitate manufacturing. The degree of acetalization can be determined using $^{1}$H-NMR.

The acetal modified polyvinyl alcohol subunits within the polyvinyl acetal polymer can have a structure according to structure (1). Within this structure R preferably represents a C1 to C11 alkyl, more preferably a C3 to C9 alkyl, most preferably a C5 to C7 alkyl. R can be linear or branched, preferably R is linear. It is believed that a polyvinyl acetal polymer with this type of acetal substitution provides the right balance between improving suds mileage performance in the presence of greasy soils, while still being able to control finished product physical stability and ability to create stable aqueous polymer solutions to facilitate manufacturing.

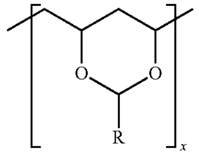

As such a polyvinyl acetal polymer can comprise three subunits, e.g. polyvinyl acetal subunits, polyvinyl alcohol subunits and polyvinyl acetate subunits. An example of such polyvinyl acetal polymer is shown in structure 2 where a polyvinyl butyral unit (R=C3 alkyl in structure 2) is shown as the polyvinyl acetal subunit. A, B and C values will be defined by the degree of acetalization and degree of hydrolysis, as expressed above, while the subunits can be randomly or block distributed, preferably randomly distributed. These polyvinyl acetal polymers can be produced through a condensation reaction of polyvinyl alcohol and the corresponding aldehyde.

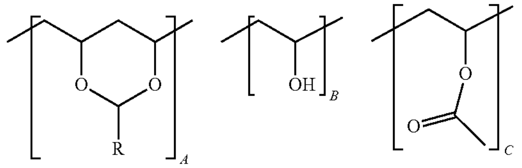

The polyvinyl acetal polymer is present at a level of from 0.05% to 5.0%, preferably from 0.1% to 3.5%, more preferably from 0.1% to 2.0% by weight of the composition.

Suitable polyvinyl alcohol starting materials for acetalization are available from various suppliers, including Kuraray, Sekisui, Nippon Gohsei, and Shinetsu, and Sigma Aldrich.

Further improvements in the suds mileage can be achieved by adding the polyvinyl acetal polymer to an aqueous composition, before adding the surfactant system.

Amphiphilic Alkoxylated Polyalkyleneimine:

The composition of the present invention may further comprise from about 0.05% to about 2%, preferably from about 0.07% to about 1% by weight of the total composition of an amphiphilic polymer. Suitable amphiphilic polymers can be selected from the group consisting of: amphiphilic alkoxylated polyalkyleneimine and mixtures thereof. The amphiphilic alkoxylated polyalkyleneimine polymer has been found to reduce gel formation on the hard surfaces to be cleaned when the liquid composition is added directly to a cleaning implement (such as a sponge) before cleaning and consequently brought in contact with heavily greased surfaces, especially when the cleaning implement comprises a low amount to nil water such as when light pre-wetted sponges are used.

A preferred amphiphilic alkoxylated polyethyleneimine polymer has the general structure of formula (II):

(II)

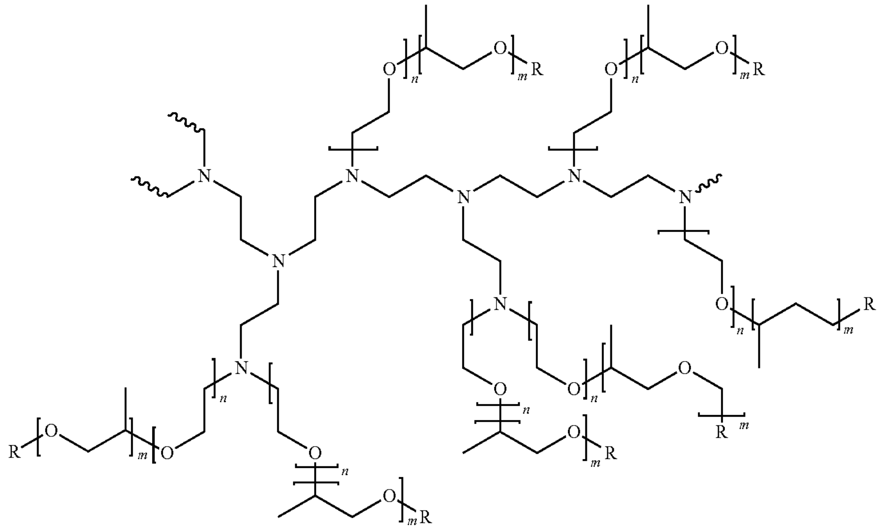

wherein the polyethyleneimine backbone has a weight average molecular weight of about 600, n of formula (II) has an average of about 10, m of formula (II) has an average of about 7 and R of formula (II) is selected from hydrogen, a $C_1$-$C_4$ alkyl and mixtures thereof, preferably hydrogen. The degree of permanent quaternization of formula (II) may be from 0% to about 22% of the polyethyleneimine backbone nitrogen atoms. The molecular weight of this amphiphilic alkoxylated polyethyleneimine polymer preferably is between 10,000 and 15,000 Da.

More preferably, the amphiphilic alkoxylated polyethyleneimine polymer has the general structure of formula (II) but wherein the polyethyleneimine backbone has a weight average molecular weight of about 600 Da, n of Formula (II) has an average of about 24, m of Formula (II) has an average of about 16 and R of Formula (II) is selected from hydrogen, a $C_1$-$C_4$ alkyl and mixtures thereof, preferably hydrogen. The degree of permanent quaternization of Formula (II) may be from 0% to about 22% of the polyethyleneimine backbone nitrogen atoms and is preferably 0%. The molecular weight of this amphiphilic alkoxylated polyethyleneimine polymer preferably is between 25,000 and 30,000, most preferably 28,000 Da.

The amphiphilic alkoxylated polyethyleneimine polymers can be made by the methods described in more detail in PCT Publication No. WO 2007/135645.

Cyclic Polyamine

The composition can comprise a cyclic polyamine having amine functionalities that helps cleaning. The composition of the invention preferably comprises from about 0.1% to about 3%, more preferably from about 0.2% to about 2%, and especially from about 0.5% to about 1%, by weight of the composition, of the cyclic polyamine.

The cyclic polyamine has at least two primary amine functionalities. The primary amines can be in any position in the cyclic amine but it has been found that in terms of grease cleaning, better performance is obtained when the primary amines are in positions 1,3. It has also been found that cyclic amines in which one of the substituents is —CH3 and the rest are H provided for improved grease cleaning performance.

Accordingly, the most preferred cyclic polyamine for use with the cleaning composition of the present invention are cyclic polyamine selected from the group consisting of: 2-methylcyclohexane-1,3-diamine, 4-methylcyclohexane-1,3-diamine and mixtures thereof. These specific cyclic polyamines work to improve suds and grease cleaning profile through-out the dishwashing process when formulated together with the surfactant system of the composition of the present invention.

Additional Ingredients:

The composition of the present invention may further comprise at least one active selected from the group consisting of: i) a salt, ii) a hydrotrope, iii) an organic solvent, and mixtures thereof.

Salt:

The composition of the present invention may comprise from about 0.05% to about 2%, preferably from about 0.1% to about 1.5%, or more preferably from about 0.5% to about 1%, by weight of the total composition of a salt, preferably a monovalent or divalent inorganic salt, or a mixture thereof, more preferably selected from: sodium chloride, sodium sulphate, and mixtures thereof. Sodium chloride is most preferred.

Hydrotrope:

The composition of the present invention may comprise from about 0.1% to about 10%, or preferably from about 0.5% to about 10%, or more preferably from about 1% to about 10% by weight of the total composition of a hydrotrope or a mixture thereof, preferably sodium cumene sulphonate.

Organic Solvent:

The composition can comprise from about 0.1% to about 10%, or preferably from about 0.5% to about 10%, or more preferably from about 1% to about 10% by weight of the total composition of an organic solvent. Suitable organic solvents include organic solvents selected from the group consisting of: alcohols, glycols, glycol ethers, and mixtures thereof, preferably alcohols, glycols, and mixtures thereof. Ethanol is the preferred alcohol. Polyalkyleneglycols, especially polypropyleneglycol, is the preferred glycol.

Adjunct Ingredients

The cleaning composition may optionally comprise a number of other adjunct ingredients such as builders (preferably citrate), chelants, conditioning polymers, other cleaning polymers, surface modifying polymers, structurants, emollients, humectants, skin rejuvenating actives, enzymes, carboxylic acids, scrubbing particles, perfumes, malodor control agents, pigments, dyes, opacifiers, pearlescent particles, inorganic cations such as alkaline earth metals such as Ca/Mg-ions, antibacterial agents, preservatives, viscosity adjusters (e.g., salt such as NaCl, and other mono-, di- and trivalent salts) and pH adjusters and buffering means (e.g. carboxylic acids such as citric acid, HCl, NaOH, KOH, alkanolamines, carbonates such as sodium carbonates, bicarbonates, sesquicarbonates, and alike).

Process of Making

In a preferred process for making a liquid detergent composition according to the invention, the polyvinyl acetal polymer, available as a commercially available powder or synthesised, for instance via the condensation reaction of polyvinyl alcohol with an aldehyde, can be pre-dissolved in an aqueous composition using methods well known to the skilled person, before adding the surfactant system and other components of the liquid detergent composition. The polyvinyl acetal polymer can be added to the aqueous composition at any suitable temperature under normal mixing, for instance, in the range of from 15° C. to 85° C., though lower temperatures of from 15° C. to 25° C. are preferred. The mixture is agitated until the aqueous solution is visually clear such that it is free of remaining polyvinyl acetal polymer particles. If heating is used to accelerate dissolution of the polyvinyl acetal polymer, the aqueous solution should be cooled sufficiently slowly to ensure proper hydration and hence full polyvinyl acetal polymer dissolution takes place. Preferably, demineralised water is used. Preferably, the polyvinyl acetal polymer is dissolved in demineralized water, before the addition of any other component, such as the surfactant system, solvents, hydrotropes, polymers, salts, preservatives, perfume, colorants, and the like. It is believed that pre-dissolving polyvinyl acetal polymer in an aqueous solution will facilitate dissolution of the polyvinyl acetal polymer into the liquid detergent composition, improving production speed of the liquid detergent accordingly. Preferably an aqueous polyvinyl acetal polymer premix is created in which the polyvinyl acetal polymer is present from 1.0% to 25%, preferably from 3.0% to 20%, most preferably from 5.0% to 15% by weight of the polyvinyl acetal polymer premix composition.

Method of Washing

The invention is further directed to a method of manually washing dishware with the composition of the present invention. The method comprises the steps of delivering a composition of the present invention to a volume of water to form a wash solution and immersing the dishware in the solution. The dishware is be cleaned with the composition in the presence of water. Optionally, the dishware can be rinsed. By "rinsing", it is meant herein contacting the dishware cleaned with the process according to the present invention with substantial quantities of appropriate solvent, typically water. By "substantial quantities", it is meant usually about 1 to about 20 L, or under running water.

The composition herein can be applied in its diluted form. Soiled dishware is contacted with an effective amount, typically from about 0.5 mL to about 20 mL (per about 25 dishes being treated), preferably from about 3 mL to about 10 mL, of the cleaning composition, preferably in liquid form, of the present invention diluted in water. The actual amount of cleaning composition used will be based on the judgment of the user and will typically depend upon factors such as the particular product formulation of the cleaning composition, including the concentration of active ingredients in the cleaning composition, the number of soiled dishes to be cleaned, the degree of soiling on the dishes, and the like. Generally, from about 0.01 mL to about 150 mL, preferably from about 3 mL to about 40 mL of a cleaning composition of the invention is combined with from about 2,000 mL to about 20,000 mL, more typically from about 5,000 mL to about 15,000 mL of water in a sink. The soiled dishware are immersed in the sink containing the diluted cleaning compositions then obtained, before contacting the soiled surface of the dishware with a cloth, sponge, or similar cleaning implement. The cloth, sponge, or similar cleaning implement may be immersed in the cleaning composition and water mixture prior to being contacted with the dishware, and is typically contacted with the dishware for a period of time ranged from about 1 to about 10 seconds, although the actual time will vary with each application and user. The contacting of cloth, sponge, or similar cleaning implement to the dishware is accompanied by a concurrent scrubbing of the dishware.

Alternatively, the composition herein can be applied in its neat form to the dish to be treated. By "in its neat form", it is meant herein that said composition is applied directly onto the surface to be treated, or onto a cleaning device or implement such as a brush, a sponge, a nonwoven material, or a woven material, without undergoing any significant dilution by the user (immediately) prior to application. "In its neat form", also includes slight dilutions, for instance, arising from the presence of water on the cleaning device, or the addition of water by the consumer to remove the remaining quantities of the composition from a bottle. Therefore, the composition in its neat form includes mixtures having the composition and water at ratios ranging from 50:50 to 100:0, preferably 70:30 to 100:0, more preferably 80:20 to 100:0, even more preferably 90:10 to 100:0 depending on the user habits and the cleaning task.

Another aspect of the present invention is directed to use of a hand dishwashing cleaning composition of the present invention for providing good sudsing profile, including suds stabilization in the presence of greasy soils.

Test Methods

The following assays set forth must be used in order that the invention described and claimed herein may be more fully understood.

Test Method 1: Suds Mileage Test

The objective of the Suds Mileage Test is to compare the evolution over time of suds volume generated for different test formulations at specified water hardness, solution temperatures and formulation concentrations, while under the influence of periodic soil injections. Data are compared and expressed versus a reference composition as a suds mileage index (reference composition has suds mileage index of 100). The steps of the method are as follows:

1. A defined amount of a test composition, depending on the targeted composition concentration (here: 0.12 wt %), is dispensed through a plastic pipette at a flow rate of 0.67 mL/sec at a height of 37 cm above the bottom surface of a sink (dimension: 300 mm diameter and 288 mm height) into a water stream (here: water hardness: 2.67 mmol/l $CaCO_3$, water temperature: 35° C.) that is filling up the sink to 4 L with a constant pressure of 4 bar.

2. An initial suds volume generated (measured as average foam height×sink surface area and expressed in $cm^3$) is recorded immediately after end of filling.
3. A fixed amount (6 mL) of a soil with defined composition as below is immediately injected into the middle of the sink.
4. The resultant solution is mixed with a metal blade (10 cm×5 cm) positioned in the middle of the sink at the air liquid interface under an angle of 45 degrees rotating at 85 RPM for 20 revolutions.
5. Another measurement of the total suds volume is recorded immediately after end of blade rotation.
6. Steps 3-5 are repeated until the measured total suds volume reaches a minimum level of 400 $cm^3$. The amount of added soil that is needed to get to the 400 $cm^3$ level is considered as the suds mileage for the test composition.
7. Each test composition is tested 4 times per testing condition (i.e., water temperature, composition concentration, water hardness, soil type).
8. The average suds mileage is calculated as the average of the 4 replicates for each sample for a defined test condition.
9. Calculate a Suds Mileage Index by comparing the average mileage of a test composition sample versus a reference composition sample. The calculation is as follows:

$$\text{Suds Mileage Index} = \frac{\text{Average number of soil additions of test composition}}{\text{Average number of soil additions of reference composition}} \times 100$$

Soil compositions are produced through standard mixing of the components described in Table 1.

TABLE 1

Greasy Soil

| Ingredient | Weight % |
|---|---|
| Crisco Oil | 12.730 |
| Crisco shortening | 27.752 |
| Lard | 7.638 |
| Refined rendered edible beef tallow | 51.684 |
| Oleic Acid, 90% (Techn) | 0.139 |
| Palmitic Acid, 99+% | 0.036 |
| Stearic Acid, 99+% | 0.021 |

Test Method 2: Determining Viscosity

For Newtonian liquid detergent compositions, the viscosity is measured at 20° C. with a Brookfield RT Viscometer using spindle 31 with the RPM of the viscometer adjusted to achieve a torque of between 40% and 60%.

For non-Newtonian liquid detergent compositions, the viscosity is measured using a controlled stress rheometer (such as an HAAKE MARS from Thermo Scientific, or equivalent), using a 60 mm 1° cone and a gap size of 52 microns at 20° C. After temperature equilibration for 2 minutes, the sample is sheared at a shear rate of 10 $s^{-1}$ for 30 seconds. The reported viscosity of the liquid hand dishwashing detergent compositions is defined as the average shear stress between 15 seconds and 30 seconds shearing divided by the applied shear rate of 10 $s^{-1}$ at 20° C.

EXAMPLES

The following examples are provided to further illustrate the present invention and are not to be construed as limitations of the present invention, as many variations of the present invention are possible without departing from its scope.

Polyvinyl Acetal Polymer Synthesis

Polyvinyl acetal polymers were synthesised using the procedure below:

A 10 wt % aqueous solution of polyvinyl alcohol (Sigma Aldrich, 3 cP for a 4% aqueous solution in demineralized water at 20° C., 80% degree of hydrolysis) was prepared by placing 225 g of demineralized water into a beaker, heating the water to 50° C. and adding 25 g of the polyvinyl alcohol incrementally while stirring. Once the polymer was fully dissolved and a homogeneous solution was obtained, the heat was turned off and the solution was allowed to cool down to room temperature. To this cooled down solution, 2.1 mL of 12 M hydrochloric acid solution was added, followed by addition of the respective reactive aldehyde (amount depending on targeted degree of acetalization), as indicated in Table 1, and the beaker was covered with a lid. The mixture was stirred at room temperature for 12 to 24 hours. The reaction mixture was brought back to a pH of 6-7 using an aqueous sodium hydroxide solution (1 M). The resulting reaction mixture was poured into a freeze dryer tray, diluted with additional demineralized water and placed into the freezer. Once the mixture was frozen, it was placed into the freeze dryer. Freeze drying yielded a white polymer containing residual salts.

TABLE 1

Reactive aldehydes used to make polyvinyl acetal polymer (supplied by Sigma Aldrich):

| PVAcetal | Reactive aldehyde |
|---|---|
| PVAcetal (C4-acetal) | Butyraldehyde |
| PVAcetal (C6-acetal) | Hexanal |
| PVAcetal (C7-acetal) | Heptanal |
| PVAcetal (C8-acetal) | Octanal |
| PVAcetal (C10-acetal) | Decanal |

The degree of acetalization was increased by increasing the amount of reactive aldehyde added to the above reaction mixture, to achieve degrees of acetalization of from 0% (polyvinyl alcohol homopolymer) up to 8.5% by mol. The average degree of acetalization of the resulting PVAcetal polymer was determined by $^1H$ NMR spectroscopy. $^1H$ NMR spectra were recorded at 25±0.2° C. using a Bruker AVANCE III 300 MHz Spectrometer, equipped with a broad band observe probe with Z-gradient. 25-30 mg of PVAcetal polymer was dissolved in 0.7-0.8 mL of DMSO-$d_6$ and a clear solution was obtained with most PVAcetal polymers. In case the PVAcetal polymer was not fully dissolved in DMSO-$d_6$, methanol-$d_4$ was used as an alternative deuterated solvent. $^1H$ NMR spectra were processed using MestReNova 14.1 software. The calculation of average degree of acetalization expressed in mole % was determined, based on the integrated chemical shift signals from the $^1H$ NMR spectrum (300 MHz) using the peak assignments as indicated in Table 2.

TABLE 2

Chemical shift assignment and integration ranges of the different NMR peaks as a function of the type of acetalization and the solvent used to dissolve the PVAcetal.

| | Chemical shift [ppm] | | |
|---|---|---|---|
| | DMSO-$d_6$ | | Methanol-$d_4$ |
| Chemical group | C4 | C6, C7, C8, C10 | C4, C6, C7, C8, C10 |
| —CH3 of acetal | 0.79-0.93 | 0.78-0.92 | 0.82-1.00 |
| —CH2— of polymer backbone and —CH2— of acetal | 0.93-1.87 | 0.92-1.88 | 1.00-1.96 |
| —CH3 of acetate | 1.87-2.06 | 1.87-2.06 | 1.96-2.11 |

Example 1: Suds Mileage Performance of Liquid Hand Dishwashing Detergent Compositions Comprising Polyvinyl Acetal Polymer The suds mileage performance in the presence of greasy soil of liquid hand dishwashing detergent compositions according to the invention (Inventive Examples 1 to 5, comprising polyvinyl acetal polymer) was compared to a liquid hand dishwashing detergent composition comprising the polyvinyl alcohol homopolymer, i.e. a degree of acetalization of 0% and hence comprised no acetal subunits (comparative example A).

The inventive examples comprised polyvinyl acetal polymer with different degrees of acetalization as shown in table 4.

TABLE 3

Composition of comparative example A, and examples according to the present invention 1-5.

| | Ex A* wt % | Ex 1 wt % | Ex 2 wt % | Ex 3 wt % | Ex 4 wt % | Ex 5 wt % |
|---|---|---|---|---|---|---|
| C12-13 $AE_{0.6}S$ anionic surfactant (avg branching: 37.84%) | 19.6 | 19.6 | 19.6 | 19.6 | 19.6 | 19.6 |
| C12-14 dimethyl amine oxide | 6.5 | 6.5 | 6.5 | 6.5 | 6.5 | 6.5 |
| Neodol 91-8 nonionic surfactant | 1.0 | 1.0 | 1.0 | 1.0 | 1.0 | 1.0 |
| PVA[1] | 2 | — | — | — | — | — |
| PVAcetal (C4-acetal)[2] | — | 2 | — | — | — | — |
| PVAcetal (C6-acetal)[2] | — | — | 2 | — | — | — |
| PVAcetal (C7-acetal)[2] | — | — | — | 2 | — | — |
| PVAcetal (C8-acetal)[2] | — | — | — | — | 2 | — |
| PVAcetal (C10-acetal)[2] | — | — | — | — | — | 2 |
| NaCl | 0.7 | 0.7 | 0.7 | 0.7 | 0.7 | 0.7 |
| ethanol | 1.8 | 1.8 | 1.8 | 1.8 | 1.8 | 1.8 |
| Polypropylene glycol (MW 2000) | 0.7 | 0.7 | 0.7 | 0.7 | 0.7 | 0.7 |
| water and minors (perfume, dye, preservative) | to 100 | to 100 | to 100 | to 100 | to 100 | to 100 |
| pH (as 10% aqueous solution) | 9.0 | 9.0 | 9.0 | 9.0 | 9.0 | 9.0 |

*Comparative

[1]Polyvinyl alcohol homopolymer: viscosity of 3 cP for a 4% aqueous solution in demineralized water at 20 ° C., 80% dH, supplied by Signa Aldrich.

[2]PVAcetal polymers synthesized from the same polyvinyl alcohol homopolymer, using the synthesis method described above Test Results:

The test data in table 5 below demonstrates that single variable replacement of a non-acetalized polyvinyl alcohol homopolymer by a polyvinyl acetal polymer according to the invention in a liquid hand dishwashing detergent formulation (Inventive examples 1 to 5) improves the suds mileage performance even in the presence of grease soils, in comparison to liquid hand dishwashing compositions comprising a non-acetalized polyvinyl alcohol polymer (Comparative example A). As can be seen below, the improved sudsing benefit in the presence of greasy soils is present across different types and degrees of acetalization.

TABLE 5

Suds mileage performance of examples A, B, 1 to 5, indexed versus example A.

| Average Degree of acetalization [mol %] | Ex A* | Ex 1 | Ex 2 | Ex 3 | Ex 4 | Ex 5 |
|---|---|---|---|---|---|---|
| Acetal type | — | C4 | C6 | C7 | C8 | C10 |
| 0% | 100 | — | — | — | — | — |
| 1%** | — | n.a. | n.a. | 109 | 107 | 106 |
| 1.5 | — | n.a. | 108 | n.a. | n.a. | n.a. |
| 2%** | — | 104 | 112 | 108 | 109 | n.a. |
| 2.5%** | — | n.a. | n.a. | 110 | 109 | n.a. |
| 3%** | — | 109 | 110 | 109 | n.a. | n.a. |
| 3.5%** | — | n.a. | n.a. | n.a. | 108 | 113 |
| 4%** | — | n.a. | 111 | n.a. | n.a. | n.a. |
| 5.5% | — | 108 | n.a. | n.a. | n.a. | n.a. |
| 7%** | — | n.a. | 111 | n.a. | n.a. | n.a. |
| 8.0%** | — | n.a. | n.a. | n.a. | 110 | n.a. |
| 8.5%** | — | 112 | n.a. | n.a. | n.a. | n.a. |

*comparative example, comprising polyvinyl alcohol homopolymer (0% acetalization)

**degree of acetalization, +/− 0.25% n.a.: not available

Example 2: Physical Stability of Liquid Hand Dishwashing Detergent Compositions Comprising Polyvinyl Alcohol and Polyvinyl Acetal Polymer The inventive and comparative hand dishwashing detergent compositions according to table 1 were stored at 50° C. for accelerated ageing testing, and were visually assessed for physical phase stability (see table 6). While the polyvinyl alcohol comprising comparative formulation (Comparative example A) became hazy and showed physical phase separation within the first week of storage, the examples according to the invention, comprising acetalized polyvinyl alcohol polymer, showed prolonged phase stability for at least one week storage at 50° C., with storage stability improving with decreasing acetal alkyl chain lengths (C10 worse versus C8 and below) and increasing degree of acetalization.

TABLE 6

Storage stability for comparative example A, and examples 2 to 5 (at 50° C.):

| | Degree of acetalization | Weeks of stability |
|---|---|---|
| Example A* | — | <1 |
| Example 2 (C6) | 1.3% | 5 |
| | 2.0% | 6 |
| | 3.1% | 7 |
| Example 3 (C7) | 1.1% | 4 |
| Example 4 (C8) | 1.0% | 4 |
| Example 5 (C10) | 0.9% | 1 |

In addition, the ability to prepare stable premixes of polyvinyl acetal polymer was assessed as follows.

10% by weight solutions of the following of polyvinyl acetal polymers were prepared by gradually adding 4 g of PVAcetal to 36 g of demineralized water at room temperature. In case dispersion of the PVAcetal in water was slow, the mixture was heated to about 80° C. The mixture was stirred for 24 hrs. After 48 hrs, the samples were visually assessed at room temperature whether a homogeneous mixture was obtained or whether phase separation with a clear precipitate was observed.

As can be seen from Table 7, the ability to prepare stable premixes of polyvinyl acetal polymer improves with decreasing levels of acetalization. At levels higher than 2.5 mol % acetalization it was only possible to make a homogeneous dispersion with C4 PVAcetal while the other PVAcetals showed precipitation in the aqueous mixtures.

TABLE 7

Physical stability of 10 wt % aqueous solutions of PVAcetal in demineralized water

| PVAcetal aqueous solution | Degree of acetalization | Physical stability |
|---|---|---|
| C4 | 2.1 | Homogeneous |
| | 3.2 | Homogeneous |
| | 5.5 | Precipitation |
| C6 | 2.0 | Homogeneous |
| | 3.1 | Precipitation |
| | 7.0 | Precipitation |
| C7 | 2.1 | Homogeneous |
| | 2.6 | Precipitation |
| | 2.9 | Precipitation |
| C8 | 2.5 | Homogeneous |
| | 3.4 | Precipitation |
| C10 | 0.9 | Homogeneous |
| | 3.6 | Precipitation |

Additional Inventive Polymer Example 6 (2.9 Mole % Hexanal Acetal)

A 10 wt % aqueous solution of polyvinyl alcohol (Sigma Aldrich, 3.2 cP for a 4% aqueous solution in demineralized water at 20° C., 80% degree of hydrolysis) was prepared by placing 225 g of demineralized water into a beaker, covering it with a lid, heating the water to 50° C. and adding 25 g of the polyvinyl alcohol incrementally while stirring. Once the polymer was fully dissolved and a homogeneous solution was obtained, the heat was turned off and the solution was allowed to cool down to room temperature. This solution was added to a 3-neck round bottom flask, equipped with a reflux condenser, stir bar and septa. Under stirring, the solution was heated to 80° C. 2.1 mL of 12 M hydrochloric acid solution was diluted with 5 mL DI water and syringed into the hot solution, followed by addition of 1.76 mL hexanal. The mixture was stirred for 4 h at 80° C. Afterwards, the heat was turned off and the solution was allowed to cool down to room temperature and stirred for 65 h. The reaction mixture was brought back to a pH 6-7 using 69 mL of an aqueous sodium hydroxide solution (1 M). The resulting reaction mixture was poured into a freeze dryer tray, diluted with additional 1 L of demineralized water and placed into the freezer. Once the mixture was frozen, it was placed into the freeze dryer. Freeze drying yielded a white polymer containing residual salts. The polymer is characterised by 88.7 mol % alcohol, 8.3 mol % acetate & 2.9 mol % acetal.

Inventive Polymer Example 7 (2.4 Mole % Benzaldehyde Acetal)

A 10 wt % aqueous solution of polyvinyl alcohol (Sigma Aldrich, 3.2 cP for a 4% aqueous solution in demineralized water at 20° C., 80% degree of hydrolysis) was prepared by placing 225 g of demineralized water into a beaker, covering it with a lid, heating the water to 50° C. and adding 25 g of the polyvinyl alcohol incrementally while stirring. Once the polymer was fully dissolved and a homogeneous solution was obtained, the heat was turned off and the solution was allowed to cool down to room temperature. To this cooled down solution, 2.1 mL of 12 M hydrochloric acid solution was added, followed by addition of 1.21 mL benzaldehyde, and the beaker was closed with a lid and covered with aluminum foil. The mixture was stirred at room temperature for 20 hours. The reaction mixture was brought back to a pH 7 using 33.2 mL of an aqueous sodium hydroxide solution (1 M). The resulting reaction mixture was poured into a freeze dryer tray, diluted with additional 1 L of demineralized water and placed into the freezer. Once the mixture was frozen, it was placed into the freeze dryer. Freeze drying yielded a white polymer containing residual salts. The polymer is characterised by 79.0 mol % alcohol, 18.7 mol % acetate & 2.4 mol % acetal.

Inventive Polymer Example 8 (2.1 Mole % 2-Ethyl Hexanal Acetal)

A 10 wt % aqueous solution of polyvinyl alcohol (Sigma Aldrich, 3.2 cP for a 4% aqueous solution in demineralized water at 20° C., 80% degree of hydrolysis) was prepared by placing 225 g of demineralized water into a beaker, covering it with a lid, heating the water to 50° C. and adding 25 g of the polyvinyl alcohol incrementally while stirring. Once the polymer was fully dissolved and a homogeneous solution was obtained, the heat was turned off and the solution was allowed to cool down to room temperature. To this cooled down solution, 2.1 mL of 12 M hydrochloric acid solution was added, followed by addition of 1.5 mL 2-ethyl hexanal, and the beaker was closed with a lid. The mixture was stirred at room temperature for 18 hours. The reaction mixture was brought back to a pH 6-7 using 31.7 mL of an aqueous sodium hydroxide solution (1 M). The resulting reaction mixture was poured into a freeze dryer tray, diluted with additional 1 L of demineralized water and placed into the freezer. Once the mixture was frozen, it was placed into the freeze dryer. Freeze drying yielded a white polymer containing residual salts. The polymer is characterised by 78.8 mol % alcohol, 19.0 mol % acetate & 2.1 mol % acetal.

Inventive Polymer Example 9 (2.5 Mole % Hexanal Acetal and 1.1 Mole % Tert. Amine Acetal)

A 10 wt % aqueous solution of polyvinyl alcohol (Sigma Aldrich, 3.0 cP for a 4% aqueous solution in demineralized water at 20° C., 80% degree of hydrolysis) was prepared by placing 225 g of demineralized water into a beaker, covering it with a lid, heating the water to 50° C. and adding 25 g of the polyvinyl alcohol incrementally while stirring. Once the polymer was fully dissolved and a homogeneous solution was obtained, the heat was turned off and the solution was allowed to cool down to room temperature. To this cooled down solution, 2.1 mL of 12 M hydrochloric acid solution was added, followed by addition of 1.2 mL hexanal, and the beaker was closed with a lid. The mixture was stirred at room temperature for 24 hours. Afterwards, 0.4 mL of 12 M hydrochloric acid solution was added, followed by addition of 1.05 mL 4-(dimethylamino)butyraldehyde diethyl acetal. The solution was stirred for another 20 hours. The reaction mixture was brought back to a pH 6-7 using 41 mL of an aqueous sodium hydroxide solution (1 M). The resulting reaction mixture was precipitated into acetone and the polymer was filtered off. The polymer was placed in a vacuum oven at 70° C. for 24 hours. Drying yielded a white polymer containing residual salts. The polymer is characterised by 77.6 mol % alcohol, 18.8 mol % acetate &2.5 mol % hexanal acetal and 1.1 mol % tert. amine acetal.

Inventive Polymer Example 10 (2.1 Mole % Tert. Amine Acetal)

A 10 wt % aqueous solution of polyvinyl alcohol (Sigma Aldrich, 3.0 cP for a 4% aqueous solution in demineralized water at 20° C., 80% degree of hydrolysis) was prepared by placing 225 g of demineralized water into a beaker, covering it with a lid, heating the water to 50° C. and adding 25 g of the polyvinyl alcohol incrementally while stirring. Once the polymer was fully dissolved and a homogeneous solution was obtained, the heat was turned off and the solution was allowed to cool down to room temperature. To this cooled down solution, 3.0 mL of 12 M hydrochloric acid solution was added to reach a solution pH of 1, followed by addition of 2.6 mL 4-(dimethylamino)butyraldehyde diethyl acetal, and the beaker was closed with a lid. The mixture was stirred at room temperature for 18 hours. The reaction mixture was brought back to a pH 6-7 using 34 mL of an aqueous sodium hydroxide solution (1 M). The resulting reaction mixture was poured into a freeze dryer tray, diluted with additional 1 L of demineralized water and placed into the freezer. Once the mixture was frozen, it was placed into the freeze dryer. Freeze drying yielded a white polymer containing residual salts. The polymer is characterised by 77.1 mol % alcohol, 20.8 mol % acetate & 2.1 mol % acetal.

Inventive Polymer Example 11 (2.4 Mole % Butyraldehyde/Octanal Acetal Mixture)

A 10 wt % aqueous solution of polyvinyl alcohol (Sigma Aldrich, 3.0 cP for a 4% aqueous solution in demineralized water at 20° C., 80% degree of hydrolysis) was prepared by placing 225 g of demineralized water into a beaker, covering it with a lid, heating the water to 50° C. and adding 25 g of the polyvinyl alcohol incrementally while stirring. Once the polymer was fully dissolved and a homogeneous solution was obtained, the heat was turned off and the solution was allowed to cool down to room temperature. To this cooled down solution, 2.1 mL of 12 M hydrochloric acid solution was added, followed by addition of 0.64 mL butyraldehyde and 0.62 mL octanal, and the beaker was closed with a lid. The mixture was stirred at room temperature for 20 hours. The reaction mixture was brought back to a pH 6-7 using 31 mL of an aqueous sodium hydroxide solution (1 M). The resulting reaction mixture was poured into a freeze dryer tray, diluted with additional 1 L of demineralized water and placed into the freezer. Once the mixture was frozen, it was placed into the freeze dryer. Freeze drying yielded a white polymer containing residual salts. The polymer is characterised by 77.6 mol % alcohol, 20.0 mol % acetate & 2.4 mol % acetal.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A liquid hand dishwashing cleaning composition comprising:

a. from about 5% to about 50% by weight of the composition of a surfactant system;

b. from about 0.05% to about 5.0% by weight of the composition of a polyvinyl acetal polymer wherein the polyvinyl acetal polymer consists of polyvinyl alcohol and polyvinyl acetal subunits and optionally polyvinyl acetate subunits, and further wherein the polyvinyl acetal polymer has an average degree of acetalization of from about 0.5 mol % to about 10 mol %, and the polyvinyl acetal subunit has a structure according to structure (I), wherein R represents C1 to C11 alkyl:

(structure 1)

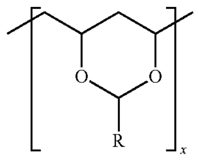

2. The liquid hand dishwashing cleaning composition according to claim 1, wherein the polyvinyl acetal polymer is present at a level of from about 0.1% to about 3.5% by weight of the composition.

3. The liquid hand dishwashing cleaning composition according to claim 2, wherein the polyvinyl acetal polymer is present at a level of from about 0.1% to about 2.0% by weight of the composition.

4. The liquid hand dishwashing cleaning composition according to claim 1, wherein the polyvinyl acetal polymer has polyvinyl acetate subunits.

5. The liquid hand dishwashing cleaning composition according to claim 1, wherein R represents a C3 to C9 alkyl.

6. The liquid hand dishwashing cleaning composition according to claim 1, wherein the polyvinyl acetal polymer has an average viscosity of from about 1 mPa·s to about 25 mPa·s when measured as an about 4% aqueous solution at about 20° C. in demineralised water, wherein the viscosity of the polyvinyl alcohol aqueous solution is measured using a Brookfield LV type viscometer with UL adapter as described in British Standard EN ISO 15023-2:2006 Annex E Brookfield Test method.

7. The liquid hand dishwashing cleaning composition according to claim 1, wherein the polyvinyl acetal polymer has an average degree of hydrolysis of from about 45% to about 98%.

8. The liquid hand dishwashing cleaning composition according to claim 7, wherein the polyvinyl acetal polymer has an average degree of hydrolysis of from about 75% to about 90%.

9. The liquid hand dishwashing cleaning composition according to claim 1, wherein the liquid hand dishwashing cleaning composition comprises from about 8% to about 45% by weight of the total composition of the surfactant system.

10. The liquid hand dishwashing cleaning composition according to claim 1, wherein the surfactant system comprises anionic surfactant.

11. The liquid hand dishwashing cleaning composition according to claim 10, wherein the anionic surfactant is an alkyl sulphated anionic surfactant selected from the group consisting of: alkyl sulphate, alkyl alkoxy sulphate, and mixtures thereof.

12. The composition according to claim 11, wherein the surfactant system comprises alkyl sulphated anionic surfactant, and wherein the alkyl sulphated anionic surfactant has an average alkyl chain length of from 8 to 18 carbon atoms.

13. The composition according to claim 11, wherein the alkyl sulphated anionic surfactant has an average degree of alkoxylation, of less than about 5.

14. The composition according to claim 11, wherein the alkyl sulphated anionic surfactant has a weight average degree of branching of more than about 10%.

15. The liquid hand dishwashing cleaning composition according to claim 10, wherein the surfactant system further comprises a co-surfactant selected from the group consisting of an amphoteric surfactant, a zwitterionic surfactant and mixtures thereof.

16. The liquid hand dishwashing cleaning composition according to claim 12, wherein the surfactant system further comprises an amphoteric surfactant selected from amine oxide surfactants.

17. The liquid hand dishwashing cleaning composition according to claim 15, wherein the weight ratio of the anionic surfactant to the co-surfactant is from about 1:1 to about 8:1.

* * * * *